Aug. 31, 1937.　　　R. J. NOBLE　　　2,091,768

RECORDING APPARATUS

Filed July 19, 1933　　　3 Sheets-Sheet 1

Inventor
Robert J. Noble
By Lyon & Lyon
Attorneys

Robert J. Noble, Inventor
By Lyon & Lyon, Attorneys

Fig.3

Patented Aug. 31, 1937

2,091,768

UNITED STATES PATENT OFFICE 2,091,768

RECORDING APPARATUS

Robert J. Noble, Glendale, Calif.

Application July 19, 1933, Serial No. 681,106

2 Claims. (Cl. 234—5.4)

My invention relates to recording devices and has particular reference to a device for making a permanent record of the operations of a concrete aggregate measuring machine.

In constructions involving the employment of concrete, modern practice requires that the various ingredients or elements forming the concrete mixture be accurately proportioned in order to insure the proper consistency of the wet concrete, and in order to insure the required strength and density of the finished, cured concrete, various devices have been developed for the purpose of measuring each of the ingredients of a batch of concrete, such devices being known in the art as concrete batch systems, and commonly employing weighing devices for weighing each of these ingredients and indicating upon a suitable register or scale the quantity of each of the ingredients as it is weighed. One form of such batch measuring system is illustrated in the patent granted to Bert Noble and Robert J. Noble, No. 1,897,490 on February 14, 1933, for Automatic concrete aggregate proportioning apparatus, wherein the various ingredients, such as rock, sand and cement, are stored in suitable bins from which individual quantities of the various materials may be drawn and deposited into a suitable weighing hopper which is balanced upon suitable scale mechanism to register when the desired amount of each ingredient has been deposited in the hopper.

When such apparatus is employed, it is a comparatively easy task to accurately regulate the quantities of the various ingredients employed in the concrete batch and by inspecting the scales from time to time the various quantities may be noted so as to insure that the successive batches which are produced by the machine will be of uniform character. However, such batch measuring devices, though registering the balance of each of the ingredients, does not make a permanent record of the same so that as soon as one of the ingredients has been measured and the machine put into operation to start the flow of the next ingredient, it is impossible for any person then inspecting the machine to determine exactly what quantity of the first ingredient has been measured out.

It is, therefore, an object of this invention to provide a batch making and measuring device of this character with means for recording the quantities of each of the materials to make a permanent record thereof so that at any later time it is possible to determine the exact proportions of material in any batch.

Another object of the invention is to provide a recording device for batch measuring devices which will be entirely automatic in its operation and in which a record of the weight of each material is exactly, accurately, and permanently recorded as a result of the balancing of the scale or other measuring device by the desired quantity of material.

Another object of the invention is to provide a batch measuring and recording device which will, upon a single instrument, register the quantity of any and all of the materials entering the mixture.

Another object of the invention is to provide a batch recording device which will identify the various quantities of each material employed in the making of any one batch with a record of the number of such batch.

Another object of my invention is to provide a recording device of the character set forth which may be readily adapted to existing batch measuring machines, and which will employ the functions of the batch measuring machines as a means of making the record.

Other objects and advantages of my invention will be apparent from a study of the following specifications read in connection with the accompanying drawings, wherein.

Figure 1:
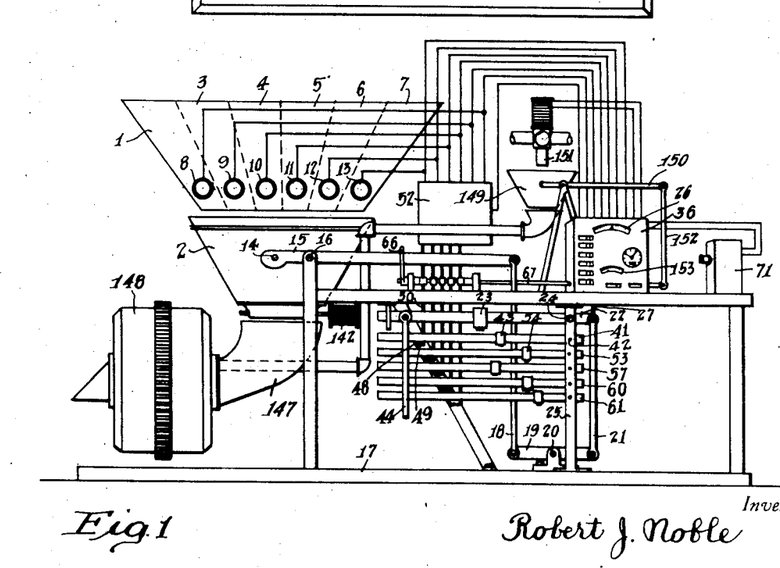
Figure 1 is a diagrammatic view of a batch making machine of the type shown in the Bert Noble, et al. patent referred to above, with my recording system arranged for operation therewith.
Figure 2:
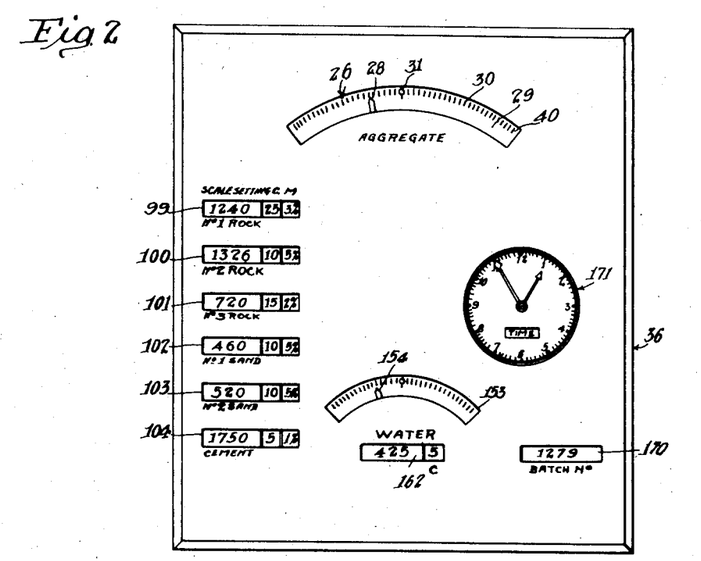
Fig. 2 is a detail, elevational view of a registering device which may be employed with my recording system as shown in Fig. 1.

Referring to the drawings, I have illustrated in Fig. 1 a batch making machine of the type disclosed in the Bert Noble, et al., patent noted above, it being understood that this illustration is diagrammatic and is not intended to disclose details of construction of such machine.

Briefly, the batch making machine comprises a plurality of material bins, not shown, each of which is provided with a suitable spout 1 through which material from the bin may be directed into a measuring hopper 2. I have illustrated the machine as adapted for measuring the ingredients commonly employed in batches of concrete, and have illustrated spouts for six dry ingredients, such as the spout 1 through which may pass large rock, a second spout 3 through which may pass medium sized rock, a third spout 4 through which may pass fine rock. Additional spouts 5 and 6 may be employed to pass coarse sand and fine sand, respectively, while the final spout 7 may be employed to pass cement to the hopper 2.

As disclosed in the Bert Noble et al. patent, each of the spouts is provided with a gate, not shown, to be operated by a gate-control magnet for the purpose of opening and closing the gates by power means to start the flow of material from any one of the spouts and to stop the same when desired. These gate-control magnets are illustrated herein at 8, 9, 10, 11, 12, and 13, respectively, associated with the spouts 1, 3, 4, 5, 6, and 7. In the diagrammatic representation of the batch making device disclosed herein the magnets are indicated as arranged to open their gates whenever the magnet is energized and to close their gates whenever the magnet is deenergized, so that by energizing and deenergizing the magnets by suitable control apparatus, hereinafter described, any one of the ingredients may be separately deposited in the hopper 2.

In order to measure and determine the quantity of any one of the materials which is deposited in the hopper, the hopper 2 is illustrated as being mounted, as indicated at 14, upon a scale beam 15 pivoted upon a suitable upright 16 which may be mounted upon a frame or base 17, the opposite end of the beam 15 being connected through a link 18 to a lever 19. The lever 19 is illustrated as being pivoted at 20 to the base or frame 17, while a second link 21 extends up to and connects with a counterpoise 22 upon which a sliding weight 23 may be mounted to balance the hopper when the desired quantity of the particular ingredient is deposited therein.

The counterpoise 22 is illustrated as being pivoted at 24 upon an upright 25, also mounted upon the frame or base 17.

Assuming that the counterpoise 22 and its sliding weight 23 are to measure or balance the hopper 2 with the first of the materials to be deposited in the hopper, for example the large rock from spout 1, the sliding weight 23 may be set to any desired position, for example to balance 1240 pounds of rock. Thus when the gate-magnet 8 is operated as hereinafter described, large rock, or "No. 1" rock from the spout 1, will enter the hopper until almost 1240 pounds are admitted to the hopper.

In order to indicate when the scale beams and counterpoise are balanced by the incoming material, a "tell-tale" or balance indicating pointer 26 may be employed which may be connected, as indicated in the Bert Noble et al. patent hereinabove referred to, by means of a rod or extension 27 upon the upper end of the link 21.

It will be observed by those skilled in the art that the extension 27 may be employed to operate a suitable pointer 28 arranged to operate over a dial 29 having suitable graduations 30 thereon so that by comparing the pointer with the graduations the balance of the scale beam may be noted.

Figure 4:
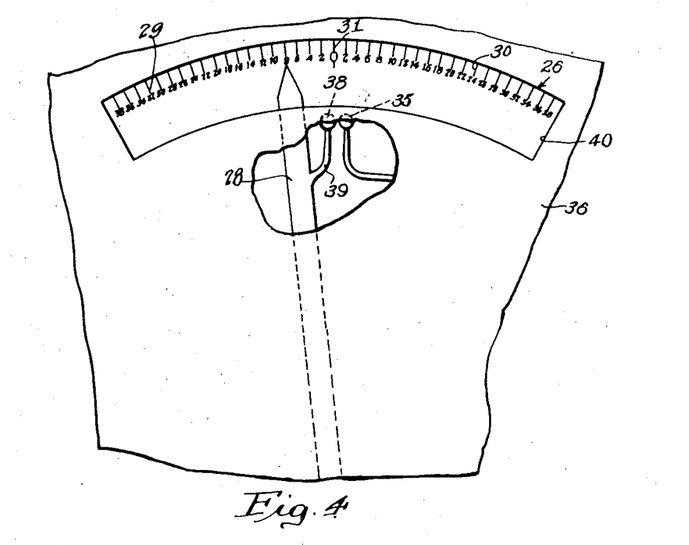
Fig. 4 is a detail view of a "telltale" balance-indicating device which may be employed with my invention.

As will be understood by those skilled in the art, the type of scale mechanism illustrated herein includes the beam 22 with its counterpoise connected directly to the hopper so that as material is deposited in the hopper the beam 22 will remain stationary until the amount of material in the hopper almost balances the beam and its counterpoise. As the material entering the hopper approaches this almost balanced condition, the beam 22 will start to move. By connecting the pointer 28 directly to the scale beam, it will be apparent that the pointer will move only when the scale beam moves and will swing across its dial 29 from an extreme left-hand position, as indicated in Fig. 4, toward the center of the dial as the scale beam 22 rises as it becomes balanced. The position at which the scale beam comes to rest, that is either in its midposition or below its midposition or above its midposition, will depend upon whether or not the material deposited in the hopper exactly balances the scale beam or is slightly less than the desired weight or is slightly beyond the desired weight.

By referring particularly to Fig. 4 it will be observed that the pointer 28 is arranged to operate over this scale 29 in such manner that when the pointer arrives at the midpoint 31 of the scale, exact balance of the scale beams and counterpoise is indicated. When the balance is reached the gate of the spout through which the material is entering into the hopper 2 should be closed, and this may be readily automatically accomplished by providing the pointer 28 with a suitable contact or electric circuit controlling device which will operate to close or open an electric circuit at the time the pointer arrives at its balanced position to cause operation of the gate magnet to close the gate which is thus put into operation. For this purpose I have indicated a circuit-controlling device illustrated particularly in Figs. 4 and 5 as comprising a suitable electric lamp 32, or other source of illumination, which may be secured in any suitable manner at the rear of the dial face 33 upon which the dial 29 is inscribed.

Figure 5:
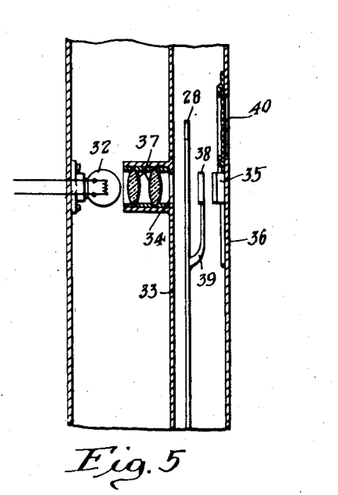
Fig. 5 is a detail sectional view of the "tell-tale" or balance-indicating device shown in Fig. 4.

The lamp 29 is preferably arranged to project a beam of light through a suitable opening 34 in the dial face 33 upon a photoelectric cell 35 mounted upon the front wall 36 of the casing or housing in which the pointer 28 and dial 29 are mounted. If desired, a suitable lens arrangement 37 may be employed to concentrate the light from the lamp 32 upon the photo-cell 35. The pointer 28 is illustrated as having a shield or mask 38 mounted thereon, preferably through the medium of a bracket 39 so that the mask 38 will arrive at a position immediately in front of the photo-cell 35 a little in advance of the arrival of the pointer at the zero or balance indication 31. The purpose of advancing the position of the mask 38 is to permit the operation of the photoelectric-cell when the scale beam and counterpoise are not quite balanced so as to start the operation of the gate to closed position before an actual balance has been reached, the material coming out of the spout which is in suspension at this time constituting a sufficient amount to carry the scale beams on to the balanced condition. In other words, the advanced arrangement of the mask compensates for the amount of the material which is in suspension between the bottom of the spout and the position of rest in the hopper 2. By properly arranging this advance action reasonably accurate cut-off of material at the exact balance point may be achieved though it will be understood as hereinafter described that the different materials will have different weights in suspension so that the advance of the mask 38 over the pointer 28 must be selected to correspond to one of the materials and suitable calculations must be made to determine the variation or compensation which must be allowed for the other materials.

The casing housing is preferably provided with an arcuate opening in its face through which the dial 29 and pointer 28 may be viewed, so that as the pointer starts to move from its extreme left-hand position, as viewed in Fig. 4, it will indicate underweight until the pointer arrives at the center or zero graduation 31, indicating perfect balance, or will indicate overweight, as the pointer passes beyond the center graduation. By positioning the mask 38 relative to the pointer 28 so that it will obscure the photoelectric cell 35 in advance of or just prior to the arrival of the pointer 28 at the zero or central graduation, the gate through which the material is then passing to the hopper will start to close just before perfect balance is reached and the material which is suspended between the gate and the hopper at that instant will then fall into the hopper bringing the weight in the hopper up to substantially perfect balance. However, should the material not exactly balance the scale beam, the pointer 28 will come to rest opposite one of the graduations upon the dial either on the left-hand side of the zero mark, indicating the amount underweight, or on the right-hand side of the zero mark indicating the amount of overweight in the hopper.

It will be understood by those skilled in the art that this arrangement may be readily accomplished by making the graduations 30 suitable to indicate the entire movement of the scale beams and the counterpoise.

With the structure thus far described it will be apparent that a person operating the batch making machine may close a circuit for the gate magnet 8 to start the inflow of material from the spout 1 and as soon as the proper amount of material required to balance the counterpoise 22 is placed in the hopper the gate 8 will be automatically closed through the operation of the photoelectric cell 35.

Figure 6:
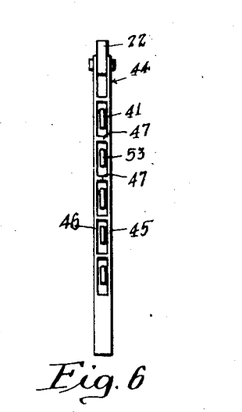
Fig. 6 is a detail view of a multiple beam hanger which may be employed on the batch making machine illustrated in Fig. 1.

The batch-making or proportioning device described in the Bert Noble and Robert J. Noble patent hereinabove referred to illustrates and provides for a separate counterpoise for each of the materials which are to be included in the batch and these additional counterpoises are diagrammatically illustrated in Fig. 1 as including a second counterpoise 41 pivoted as at 42 upon the upright 25 and provided with a sliding weight 43 similar to the weight 23. After the counterpoise 22 has been balanced and it is desired to place another material into the hopper, it will be apparent that sufficient counterpoise must be provided for the hopper 2 which will include not only that necessary to balance the first material, but also that necessary to balance the additional second material to be deposited therein. For this reason the counterpoise 22 is illustrated as having upon its outer end a link 44 illustrated particularly in Fig. 6 as comprising a pair of vertically extending strips 45 and 46 which will extend downwardly from the counterpoise 22 and is provided with a plurality of cross bars 47, one of which is immediately below the outer end of the counterpoise 41. Normally the counterpoise 41 is held upwardly out of engagement with the cross bar 47 by means of a bellcrank 48 pivoted at 49 and one arm of which engages below the counterpoise 41 while the other arm of which has a vertical rod 50 pivotally connected thereto and arranged to be locked against upward movement by a latch 136 controlled by a relay 51 (see Fig. 3), which may constitute one of a group of control relays enclosed in a suitable housing, indicated at 52, so that only when relay 51 is energized to swing the latch 136 out of the vertical path of movement of the rod 50 will it be possible for the bellcrank 48 to rotate about its pivot 49 and allow the counterpoise 41 to descend and engage the cross bar 47. However, when the relay 51 is energized and the counterpoise 41 engages the cross bar 47, it will be apparent that not only the weight represented by the counterpoise 22 but also the weight represented by the counterpoise 41 will be placed upon the scale beam so that a predetermined quantity of the second material will again be required to balance the hopper in accordance with the position at which the sliding weight 43 is set.

Similarly a counterpoise 53, having a weight 54, is arranged to engage another of the cross bars 47 when its bellcrank is released by its relay 55 (see Fig. 3), operating upon a second rod 56. In like manner the next material is balanced by an additional counterpoise 57 which will be placed into action by a rod 58 controlled by a relay 59, while additional counterpoises 60 and 61, controlled respectively by relays 62, 63, operating rods 64 and 65, may be placed into action to measure their respective quantities of materials employed in the batch.

Figure 3:
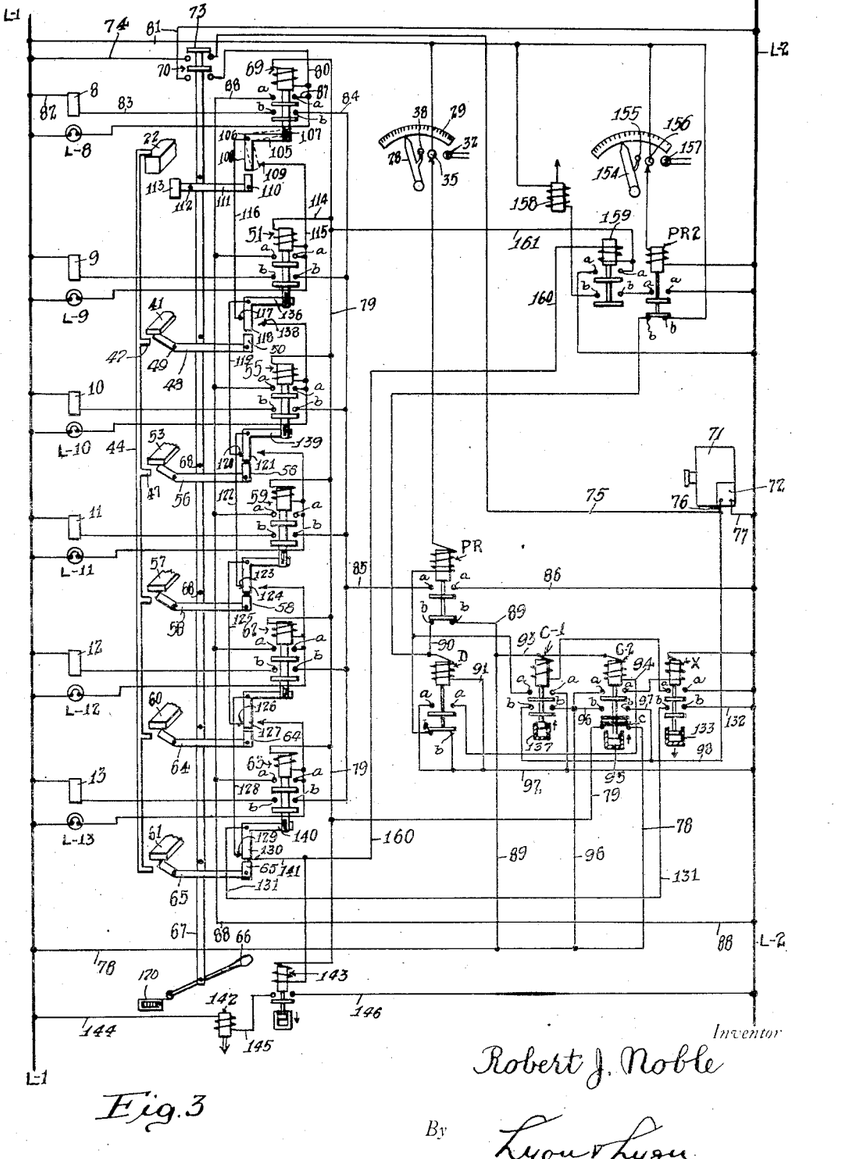
Fig. 3 is a diagrammatic view illustrating one form of electric wiring system which may be employed with my invention.

After the counterpoises 41, 53, 57, 60, and 61 have been released by the operation of their respective relays 51, 55, 59, 62, and 63, all of the counterpoises may be simultaneously elevated to restore the machine for the start of a new cycle of operations by the actuation of a suitable batch-starting handle 66 which operates a rod 67 which is coupled in any suitable manner to depress the rods 50, 56, 58, 64, and 65. In Fig. 1 the batch-starting rod 67 is illustrated as engaging directly with the rods 50, 56, etc. though for purposes of diagrammatic illustration in Fig. 3 I have illustrated the rod 67 as having a plurality of pins 68 thereon arranged in such manner that when the rod 67 is drawn downwardly the pins will engage and depress all of the bellcrank arms associated with the rods 50, 56, etc., though it will be understood by those skilled in the art that the showing on Fig. 3 is for diagrammatic purposes only and that actually the rod 67 has a loose coupling directly with the rods 50, 56, etc. When the bellcranks are swung about their pivots the outer ends of the bellcranks will engage and lift the respective counterpoises 41, 53, 57, 60, and 61 out of engagement with their cross bars 47. When the rods 50, 56, 58, 64, and 65 have been lowered sufficiently the latches 136, 139, 124, 127, 130 associated with the respective relays 51, 55, 59, 62, and 63, will be repositioned above the rods to lock the bellcranks in this position and hold the counterpoises elevated until their respective relays are actuated to release or drop the counterpoises upon the link 44.

The operation of the apparatus thus far described will be best understood by tracing a complete cycle of operations for measuring the dry ingredients or aggregate to be measured for a batch.

By referring particularly to Fig. 3 it will be observed that the gate magnets 8, 9, 10, 11, 12, and 13 are illustrated as being connected in suitable electric circuits (the circuit for gate 8 being fully traced hereinafter, while the circuits for the remaining gate magnets extend in exactly the same manner as that for gate magnet 8) to be controlled respectively by relays 69, 51, 55, 59, 62, and 63, so that the start of the cycle may be accomplished by closing the circuit for controlling the relay 69. Prior to the start of the cycle, the handle 66 is moved downwardly to lock all of the counterpoises 41, 53, 57, 60, and 61 out of engagement with the cross bars 47 of the link 44 so that only the counterpoise 22 is effectively associated with the hopper. The empty hopper is therefore supported solely by the counterpoise 22 and the machine is ready to start its cycle of operations. It is desirable that at this time a photograph be taken of the position of the pointer 28 so as to record the weight setting of the scale beam for the first of the materials entering the batch.

For this purpose I have illustrated a camera 71 arranged to photograph the face 36 of the dial housing, such camera being illustrated in Fig. 1 as being mounted upon the frame 17 with its lens directed toward the front plate 36 of the dial housing. Thus by properly coordinating the exposures to be made by the camera 71 with the positions of the scale beam and with the particular gate which is in operation at any time and with the position of the pointer 28 at any time, successive photographic records may be made which will accurately record the condition of the machine throughout its cycle of operations.

The particular recording mechanism may assume various forms, though I prefer to employ a photographic recording method as the simplest and most accurate device and which may employ well-known camera constructions. The camera which is to be employed may be of any suitable type which will record a series of exposures upon successive sections of a film strip and such camera is preferably equipped with a magnetically operated device which will operate the shutter and then feed the film to a position presenting an unexposed film section ready for the next exposure. One type of camera particularly adapted for this work is that shown in the patent issued to Charles R. Seeling, No. 1,864,768 on June 28, 1932, wherein a camera employing a strip of motion picture film is arranged with a shutter and feeding mechanism so that actuation of the shutter will make an exposure upon one frame of the film and then the film strip will be fed to present a new frame of the film ready for the next exposure upon the next operation of the shutter. A magnet or an electromagnetic shutter operator may be added to this camera for the purpose of actuating the shutter whenever the magnet is energized. Thus the film strip will include a series of photographs of the machine or of the dial and pointer mechanism to constitute a permanent record of the operations of the batch making machine. Thus at the time of starting a new cycle of operations of the batch making machine by operating the handle 66 a photograph should be made of the rest position of the dial and pointer with the empty hopper supported upon the counterpoise 22. This may be readily accomplished by connecting the camera magnet 72 in an electric circuit which will be controlled by a switch 73 operated by the handle 66.

Referring to Fig. 3, this circuit may be traced as extending from one side of a suitable power source, indicated by the reference character L—1, through a conductor 74, contacts of the switch 73, conductors 75 and 76, the camera operating magnet 72, and thence by way of conductor 77 to the opposite side of the power source indicated by the reference character L—2. If desired suitable time delay mechanism such as the ordinary self-timers for camera shutters may be interposed in the operation of the camera to insure that the hopper and its counterpoise will come to rest before the actual exposure is made.

The operation of the handle 66 starts the cycle of operations of the batch making machine by opening the gate to allow the first of the materials for the batch to be deposited into the hopper. This is accomplished by momentarily completing a circuit for a relay 69 which in turn controls the gate magnet 8 for the first spout 1. The circuit for relay 69 may be traced from line conductor L—1 through conductor 78 to normally closed contact c of a camera operating relay C—2, conductor 79, the coil of relay 69, conductor 80, switch contacts 70 (closed by operating handle 66), conductor 81 to line conductor L—2. Relay 69, when energized, closes its contacts b to complete a circuit for the gate operating magnet 8, which circuit extends from line conductor L—1 through conductor 82, gate magnet 8, conductor 83, contact b of relay 69, conductors 84 and 85 and contact a on a relay PR controlled by photoelectric cell 35 and thence by way of conductor 86 to line conductor L—2.

Since at this time the photoelectric cell is exposed to the direct influence of the light from the lamp 32, the relay PR will be energized and will maintain the contacts a of this relay closed until sufficient material has been deposited from the spout 1 into the hopper to cause the pointer 28 to interpose the mask 38 between the light 32 and the photoelectric cell 35. Since it is necessary to maintain the gate magnet 8 energized for a sufficient length of time to allow the deposit of the necessary material in the hopper, I provide a self-holding circuit for the relay 69 which circuit extends from line conductor L—1 through the coil of relay 69 as previously traced for this coil; thence the circuit extends by way of conductor 87, contact a of relay 69 and conductor 88 to line conductor L—2. Thus relay 69, once energized, will be maintained energized until the camera 71 has been actuated by this relay C—2 to photograph the balanced condition of the hopper with the first material therein.

The material deposited in the hopper 2 from the spout 1 will gradually balance the counterpoise 22 until the pointer 28 moves its mask to obscure the photo cell 35, at which time the current flowing through the photoelectric cell relay PR will be diminished to such extent that the relay PR will be de-energized and will open its contacts a. The opening of the contacts a on relay PR will automatically de-energize the gate magnet 8, causing the gate for the spout 1 to close, thus stopping further deposit of material from the spout 1 to the hopper.

Again it is desired to photograph the condition of the machine with the first material deposited in the hopper and it is essential that sufficient time be permitted between the de-energization of the gate magnet 8 and the time at which the photograph is to be taken to permit the counterpoise and the pointer to come to a position of rest. This may be accomplished by employing a time delay mechanism of any suitable character to delay the operation of the camera for a matter of a few seconds, and I have illustrated herein such mechanism as including a delay relay D, the circuit to which will be completed as soon as the relay PR is de-energized. The circuit for the relay D is illustrated as extending from line conductor L—1 through conductors 78 and 89, normally closed contacts b on relay PR, conductor 90 of coil of relay D, and conductors 91 and 92 to line conductor L—2. The relay D, upon being energized, immediately opens its normally closed contacts b to prevent the reenergization of the relay PR. At the same time relay D closes its contacts a to complete a circuit for energizing the camera relay C—2, which circuit extends from line conductor L—1, through conductors 78, 89 and 93, the coil of relay C—2, conductor 94, contacts a on relay D and conductor 92 to line conductor L—2. The relay C—2, however, is provided with a time delay mechanism which will prevent the immediate closing of its contacts to insure that sufficient time will elapse to allow the pointer to come to rest before the relay C—2 will complete the circuit for operating the magnet 72 for the camera. This time delay mechanism is illustrated herein as including a dash pot 95.

At the expiration of the time imposed by the dash pot 95 the relay C—2 will close its contacts b to operate the camera 71. This latter circuit extends from line conductor L—1 through conductors 78 and 96, contacts b on relay C—2, conductors 97 and 98, the camera magnet 72, and thence by way of conductors 77 to line conductor L—2.

At the time the photograph resulting from the operation of relay C—2 is made, it is desirable that the film upon which the exposure is made should not only register the position of rest of the pointer 28 but should also be provided with some distinguishing characteristic to clearly indicate that this applies only to the first material to enter the batch. This may be accomplished in any desired manner, as for example, by providing a plurality of windows in the front plate 36 of the dial housing, such windows being indicated by the reference characters 99, 100, 101, 102, 103, and 104 associated respectively with each of the six dry ingredients to enter the batch. The window 99 is illustrated as being provided with suitable indicia indicating the quantity of the first material which is desired to be placed into the batch so that by photographing these indicia a record will be made of the desired quantity and by comparing the same with the position of the pointer 28 a comparison between the desired quantity and the actual quantity deposited in the hopper may be made.

The indicia employed are preferably transparent or translucent so that by illuminating the window 99 from the rear thereof the indicia will be visible so as to register upon the film when the exposure is made, though I prefer that the material selected for the indicia be such that unless the lamp behind the window is illuminated the indicia will not register upon the film.

By referring particularly to Fig. 3 it will be observed that the relay 69, which is operated to control the gate magnet 8, also completes a circuit to a lamp L—8 which may be considered the lamp at the rear of the window 99, and thus only while the relay 69, associated with the first material, is energized will this lamp be illuminated to cause the registration of the indicia in the window 99 upon the film. The machine is now in condition to measure the next material for the batch. In order to accomplish this result it is first necessary to place the second scale beam 41, associated with the second material, in effective relation with the scale beam 22 and it is also necessary to then open the gate 4 for the second material.

By referring particularly to Fig. 3, it will be observed that when the relay 69, employed to control the gate 8, was first energized it operated a trip switch mechanism to condition the relay 51 for the second material ready to be operated at the end of the first of the measuring steps of the cycle. For the purposes of this description, the trip switch is illustrated as comprising a bellcrank 105 pivoted at 106, one end of the bellcrank being connected through a pin and slot mechanism 107 to the lower end of the armature of the relay 69 so that when the relay 69 is energized the bellcrank is moved to the position indicated in dotted lines to bring the switch arm 108 of the bellcrank into contact with a stationary contact finger 109. It will also be observed that the trip switch, when moved to tripped position, should remain in this position until the completion of the entire cycle of operations of the batch making machine and for this purpose I have illustrated a latch 110 mounted upon a lever 111 pivoted at 112 and provided with some device, such as a counterweight 113, to cause the right-hand end of the lever to move upwardly behind the switch arm 108 to hold the same in contact-closing position with the contact 109. Thus when the relay 69 was energized the trip switch closed contacts 108 and 109 to prepare the circuit for the relay 51 but at that time the relay 51 could not be energized, since the energizing circuit for this relay cannot be completed until after the operation of the camera relay C—2. This is best understood by tracing the energizing circuit for the relay C—2 which circuit extends from line conductor L—1 through conductor 78, contacts c on relay C—2, conductors 79 and conductor 114, the coil of relay 51, conductor 115, contacts 109 and 108 on the trip switch associated with relay 69, conductor 116, the normally closed contacts 117 and 118 of a trip switch associated with the relay 51, conductor 119, contacts 120 and 121 associated with the trip switch of relay 55, conductor 122, contacts 123 and 124 on trip switch associated with relay 59, conductor 125, contacts 126 and 127 of a trip switch associated with relay 62, conductor 128, contacts 129 and 130 of a trip switch associated with relay 63, conductor 131, contacts b of an auxiliary relay X, conductor 132 to line conductor L—2.

It will be observed from tracing this circuit that it is essential that the relay X be energized and the relay C—2 be de-energized before a circuit can be completed to operate the relay 51. It will also be observed that the relay X has its coil in circuit with contacts a on relay C—2 so that the relay X is only energized momentarily when the relay C—2 is actuated to make the photographic record of the pointer after the material has been deposited in the hopper.

It will also be observed that the relay X is provided with a suitable time delay mechanism diagrammatically illustrated as a dash pot 133 which will prevent the relay X from immediately opening its contacts when relay C—2 is de-energized so that for a relatively short period of time after the above-mentioned photograph has been made the relay C—2 will close its contacts c while the relay X maintains its contacts b closed.

Thus while the relay 69, upon its energization to start the first material into the hopper immediately prepares the circuit for the relay 51, such circuit cannot be completed until after the subsequent photograph has been taken. However, as soon as the relay C—2 has been actuated to take the subsequent photograph the circuit is completed for the relay 51 and this relay will be energized to close its contacts to prepare a circuit for the gate magnet 9 for the second material and also to operate the trip switch 118 associated with the relay 51.

The operation of the relay 51 moves its trip switch 118 from the position shown in Fig. 3 to a position corresponding to the dotted line position for the trip switch associated with relay 69. As was described with reference to Fig. 1, the counterpoise 41, associated with the second material, has up to this time been held out of active engagement with the counterpoise 22 by the bellcrank 48. This action is illustrated in Fig. 3 in a diagrammatic form by showing the bellcrank 48 as pivoted at 49, the outer end of the bellcrank being provided with a vertically extending rod 50 which engages the lower end or switch element 118 of latch 136 actuated by relay 51. Thus until the relay 51 is energized and has moved the latch 136, the bellcrank arm cannot be depressed but as soon as the latch 136 is moved the rod 50 may rise allowing the bellcrank 48 to lower its counterpoise 41 into engagement with the link 44 and thus place the counterpoise 41 in effective relation with the counterpoise 22 to add the desired weight for the new material to the already balanced weight of the first material which is now in the hopper.

It will also be observed that at the time the counterpoise 41 is placed into active relation with the counterpoise 22 the circuit for the gate magnet 9 cannot be completed even though the contacts of relay 51 are closed, since the circuit for the gate magnet 9 extends through the contacts a on the photoelectric relay PR which is at this time in open-circuit condition. Thus even though the relay 51 has been energized to place the counterpoise 41 in effective relation with the counterpoise 22 the second material does not start depositing in the hopper until a predetermined time thereafter, thus permitting the hopper to be supported upon both counterpoises 41 and 22 a sufficiently great length of time to allow the pointer 28 to return from its zero position to a position corresponding to the weight represented by the counterpoise 41. Also this pause is sufficiently long to allow a second exposure to be made by the camera 71 so that a record may be made of the unbalanced condition of the hopper to record the desired weight of the second material, or, in other words, to record the setting of the counterpoise 41 for the desired weight of the new material. This is accomplished by providing the auxiliary relay X with contacts a arranged to energize a second camera-operating relay C—1.

However, the second camera-operating relay C—2 is provided with a suitable time delay mechanism illustrated as a dash pot 137 which will delay the operation of the camera a sufficiently long period to permit the scale beam to come to rest with the counterpoise 41 associated therewith before this relay will close its contacts b to actuate the camera magnet 72.

After the second exposure has been made by the camera the gate magnet 9 may then be energized to start the inflow of the new material and for this purpose I have illustrated the camera coil C—1 as being provided with a pair of contacts a which when closed completes an auxiliary or pickup circuit for the photoelectric cell PR which circuit extends in shunt relation to the normally closed contacts b of relay D. Thus after the second exposure is made by the camera the gate magnet 9 is energized to start the new material into the hopper, such material flowing into the hopper until the scale pointer 28 again approaches the zero position, as balance between the hopper and the scale beam occurs.

It will be noted that the photoelectric relay PR is maintained in open circuit condition during the time that the pointer was retracting from its zero position so that any movement of the pointer is positively prevented from again de-energizing the relay PR until after the new material has been deposited in the hopper and substantial balance thereof achieved. When substantial balance of the new material is achieved the relay PR will again be de-energized by the interposition of the mask 38 between the lamp 32 and the photoelectric cell 35.

As was described with reference to the balancing of the hopper with the first of the materials, the de-energization of the photoelectric cell PR is followed by the energization of the relay D and subsequently by the actuation of the camera relay C—2 to again operate the camera 71 to photograph the position of rest of the pointer 28.

It will also be observed that during the time the relay 51 was closed it completed a circuit for a lamp L—9 at the rear of the window 100 on the face 36 of the dial housing so that any indicia corresponding to the desired amount of the second material will be exhibited during the photographing of the dial face both before and after the second material has been deposited in the hopper.

It will also be observed that upon the energization of the relay 51 its latch 136 will be actuated to open contacts 118 and 117 and to close contacts 118 and 138. The opening of contacts 117 and 118 prevents the re-energization of relay 51 during the subsequent operations of the machine, while the closing of contacts 118 and 138 prepares the circuit for the energization of the next relay 55 controlling the third material to be deposited in the hopper.

As was described with reference to the operation of relay 51 and its associated bellcrank 48 and counterpoise 41, the sequence of operations which results in the actuation of the camera relay C—2 after the second material has been deposited in the hopper will also result in the completion of that part of the circuit extending from conductor 79 which conductor is common to all of the relays 51, 55, etc. so that after the camera has been actuated to photograph the apparatus at the end of the deposit of the second material the relay 55 will be energized to operate its trip switch 139, thus placing its counterpoise 53 in effective relation with the counterpoises 22 and 41. At the expiration of the time determined by the dash pot 133 on auxiliary relay X the camera relay C—1 will again be actuated to photograph the condition of the pointer 28 with the three counterpoises now in action and in like manner the operation of the camera coil C—1 will result in the re-establishment of the circuit for the relay PR which will in turn complete the circuit for the gate magnet 10, which circuit is partially completed through contacts b of relay 55 in the same manner as was described with reference to the relay 51.

The relay 55 also completes a self-holding circuit for itself and a circuit for the energization of the lamp L—10 associated with the window 101 in the same manner as was described with reference to the operation of relay 51.

The machine thus continues its cycle of operations for the rest of the materials in the batch by actuating the relays 59, 62, and 63 in the same manner as was described with reference to relays 51 and 55, it being understood that for each of the materials the cycle of operations is as follows:

(a) After the camera has made the exposure with the hopper filled with the preceding material the relay associated with the next material is momentarily actuated.

(b) The counterpoise for the next material is placed in effective relation with the link 44.

(c) A photograph is made of the position of the pointer thereafter.

(d) The gate for this next material is opened by the re-establishment of the photoelectric relay circuit.

(e) Material is deposited in the hopper until balance is achieved.

(f) The photo cell relay PR stops the inflow of material.

(g) The camera relay C—2 operates to record the balanced condition of the hopper.

(h) The auxiliary relay X operates to repeat the cycle for the next material.

This repetition of the cycle of operations for each of the materials continues until the last material controlled by the relay 63 is deposited in the hopper.

It will be observed that the trip switch 140, associated with relay 63 when actuated closes its contacts 130 and 141, which may be employed to perform two functions, first, to operate a dumping device for the hopper 2, which is illustrated diagrammatically in Fig. 1 as comprising a suitable gate which is to be operated by energization of a magnet 142.

It will be observed that the closing of the contacts 130 and 141 will partially complete a circuit for a hopper gate operating relay 143 which circuit like the circuits for the relays 51, 55, 59, 62 and 63, cannot be completed until after the subsequent operation of the camera magnet C—2.

After the relay 63 has actuated its gate magnet 13 and the last of the materials or cement has been deposited in the hopper 2 and a photograph taken of the balanced condition thereof, the relay 143 will be energized to close its contacts to complete a circuit for the hopper gate magnet 142 which latter circuit extends from line conductor L—1 through conductor 144 of coil of hopper gate magnet 142, conductor 145, the contacts of relay 143, conductor 146 to line conductor L—2. If desired, a time delay may be imposed upon the relay 143 to insure that it will hold its contacts closed a sufficiently long length of time to allow the contents of the hopper to be fully emptied therefrom.

By referring particularly to Fig. 1, it will be observed that the hopper discharges its contents into a guide spout 147 which is illustrated as conducting the material into a mixer 148 which may be of any suitable type.

The second function to be performed in the cycle of operations is to measure out the water which is required for the particular batch and this may be readily accomplished by providing a secondary hopper 149 mounted upon a suitable scale beam 150 in a position immediately below the discharge end of a water valve 151 so that water discharging from the valve 151 may be deposited in the hopper until the scale beam 150 is balanced. The scale beam 150 is illustrated as being connected through suitable links 152 to a second balance indicator 153 on the dial housing 36. The balance indicator 153 has associated therewith a pointer 154 which in turn may be provided with a suitable mask 155 (Fig. 3) adapted, like the mask 38, to be interposed between a second photoelectric cell 156 and a lamp 157.

The water valve may be controlled by means of a suitable valve magnet 158 which may be energized through the actuation of a suitable relay 159 (see Fig. 3), and may be de-energized through the operation of a second photoelectric cell relay PR—2 connected in circuit with the photo cell 156.

It will be observed that immediately upon the closure of the contacts 130 and 141 a circuit is partially established through the conductor 160 and the coil of the relay 159, whence the circuit extends by way of conductor 161 to the conductor 79 which constitutes the common conductor for all of the relays 69, 51, 55, etc. Thus as soon as the photograph has been taken by the actuation of camera relay C—2 after the last of the dry materials has entered the hopper 2, the relay 159 will be energized to close its contacts b to operate the water valve.

It will also be observed that each time a photograph is taken of the front plate 36 of the dial housing the position of the water dial 153 will be registered thereon, and by the employment of a suitable window 162 an indication may be made and a record taken of the desired amount of water for the batch, or, in other words, the weight which is required to balance the scale beam 150. The relay 159, like relays 51, 55, etc., is provided with a self-holding circuit completed through its contacts a so that once this circuit is established it will be maintained until the subsequent operation of the camera relay C—2 to make a photographic record of the balanced condition of the water hopper. The water valve magnet 158 is illustrated as having its circuit extend through contacts a on the photoelectric relay C—2 so that as soon as balance is achieved by the incoming water and the mask 155 is interposed between the photo cell 156 and the lamp 157 the relay PR—2 will be deenergized to open the valve magnet circuit and stop further ingress of water. At the same time the de-energization of the relay C—2 will close its contacts b to establish a circuit for the relay D to cause this relay to be energized to thereby carry out the sequence of operations of the relay C—2 and the auxiliary relay X to make a photographic record of the balanced condition of the water hopper.

The cycle of operations of the batch making machine is now complete, the machine having individually measured each of the dry ingredients for the batch, and measured the water for the batch, and has made a photographic record both before and after each of the materials has been deposited in its respective hopper. The machine is therefore ready to start a new cycle of operations and I prefer to prevent the restarting of the cycle of operations until after the handle 66 has been manually actuated. The operation of the handle 66 to start a new cycle of operations draws downwardly the bar 67 which engages each of the bellcranks 65, 64, 58, 56, and 50, and also the lever 111 to draw down all of these bellcranks and levers to remove the vertical members at the right-hand ends thereof out of their holding relation with the trip switches associated with each of the relays 69, 51, etc. Thus all of the trip switches are restored to their normal condition and at the same time all of the bellcranks are restored to their normal conditions supporting their individual counterpoises, leaving only the counterpoise 22 in active relation with the hopper 2. It will also be understood that at this point when the bar 67 is actuated to restore the trip switches and the counterpoises to normal, the switch 73, associated with the bar 67, is actuated to photograph the condition of the machine at this time, namely, with the empty hopper supported only by the counterpoise 70.

Since it is desired that each of the records which is made by the camera be identified with the particular batch then under measurement, a suitable counter 170 may be employed mounted upon the plate 36 of the dial housing so as to register the batch number then under measurement and this counter may be connected as indicated in Fig. 3 to the handle 66 so that each operation of the handle 66 to start a new cycle of operations will cause the counter to change its registration to the next consecutive number.

It may also be desirable to provide a clock or other time indicating device 171 upon the plate 36 so that a record not only of the batch number and the weights may be made, but also the time at which the particular batch was made and recorded.

I claim:
1. In a batch-making machine, a hopper for receiving a plurality of different materials, means for individually and successively feeding said materials into said hopper, means for indicating the weight of each material deposited in said hopper, means for successively photographing said indicator when each of the materials is deposited in said hopper, and means actuated by movement of said indicating means into indicating position for actuating said photographing means.

2. A device for successively weighing and recording the weight of a load as the load is increased by increments successively added thereto comprising: scale means including a hopper for receiving the load, a plurality of counterpoises adapted to be coupled to said hopper to counterbalance the latter and an indicator for indicating balance, or deviation from balance, between said hopper and counterpoises coupled thereto; means for successively coupling said counterpoises to said hopper to repeatedly counterbalance said hopper as successive load increments are deposited therein, and means operably responsive to successive movements of said indicator as said scale means is successively balanced, or approximately balanced, for successively recording the position of said indicator at the end of the deposit of each of said load increments in the hopper.

ROBERT J. NOBLE.